United States Patent [19]

Silberberg

[11] 4,359,343
[45] Nov. 16, 1982

[54] FILLED POLYOLEFIN COMPOSITIONS AND FILLER MATERIAL

[75] Inventor: Joseph Silberberg, Brooklyn, N.Y.

[73] Assignee: Stauffer Chemical Company, Westport, Conn.

[21] Appl. No.: 286,509

[22] Filed: Jul. 24, 1981

Related U.S. Application Data

[62] Division of Ser. No. 108,752, Dec. 31, 1979, Pat. No. 4,309,333.

[51] Int. Cl.$^3$ ............................ C08K 5/53; C08K 9/04
[52] U.S. Cl. ................................ 106/308 Q; 106/304
[58] Field of Search ........................... 106/308 Q, 304

[56] References Cited

U.S. PATENT DOCUMENTS

| | | | |
|---|---|---|---|
| 3,344,107 | 9/1967 | Miller | 260/37 |
| 3,792,008 | 2/1974 | Neuroth | 260/30.6 SB |
| 3,970,729 | 7/1976 | Walsh | 260/978 |
| 4,174,340 | 11/1979 | Luders et al. | 260/42.14 |
| 4,183,843 | 1/1980 | Koening et al. | 260/40 R |

FOREIGN PATENT DOCUMENTS 55-66979  11/1978  Japan.

OTHER PUBLICATIONS

"Talc Platelets Act as Reinforcing Filler", Radista--Plastics Compounding, Sep./Oct. 1979, pp. 23-24.
Chem. Abst., vol. 87, 1977, p. 38-Jakokai, 77,45644, 4-77, Chikashi et al.

*Primary Examiner*—Carman J. Seccuro
*Attorney, Agent, or Firm*—Richard P. Fennelly

[57] ABSTRACT

Filled polyolefin compositions having improved thermal stability characteristics are formed by incorporation therein of an effective amount for improvement of such a characteristics of a di(polyoxyalkylene)hydroxyalkyl phosphonate. In most filled polyolefin compositions, the phosphonate also results in color improvement.

4 Claims, No Drawings

FILLED POLYOLEFIN COMPOSITIONS AND FILLER MATERIAL

This is a division, of application Ser. No. 108,752 filed Dec. 31, 1979, now U.S. Pat. No. 4,309,333.

BACKGROUND OF THE INVENTION

1. Field of the Invention

The present invention relates to filled polyolefin compositions having improved thermal stability characteristics, and, in most cases, improved color.

2. Description of the Prior Art

Fillers have been used in polyolefin polymers to impart such effects as improved dimensional rigidity and lower costs to the resulting blend of filler and polymer. Such filled polyolefin compositions find utility in a wide variety of applications, including in the manufacture of various formed and molded articles, e.g., appliance components, under-the-hood automotive parts, and instrument housings. However, use of these polymers at relatively high service temperatures has sometimes resulted in thermal degradation of the polymer/filler blend. Also, the use of certain types of fillers in polyolefin polymers result in a blend having a color that is darker than desired. Various approaches have been used to improve the thermal stability and color characteristics of such filled polyolefin compositions.

U.S. Pat. No. 3,425,980 to B. O. Baum advocates the use of a non-acidic, oxygen-containing hydrocarbon or halogenated hydrocarbon to coat clay fillers contained in polyethylene compositions to yield novel white and colorable polyethylene compositions.

U.S. Pat. No. 3,553,158 teaches the use of a variety of "talc deactivating compounds" including such organic polar compounds as epoxides, amides, acrylate polymers and aliphatic polyols to improve the thermal stability of talc-filled polypropylene.

More recently, Japanese Kokai 77 45,644 (as abstracted in Chem. Abstr., Vol. 87, 54094y, 1977) teaches a heat resistant polyolefin resin containing filler and a mixture of polyoxyalkylene acid phosphates and a sulfur-containing compound of the formula $C(CH_2OCOCH_2CH_2SR)_4$, where R is a $C_{10}$-$C_{20}$ alkyl group.

SUMMARY OF THE PRESENT INVENTION

The present invention are filled polyolefin compositions containing an effective amount of a composition comprising a neutral dipolyoxyalkylene hydroxyalkyl phosphonate for improved thermal stability of said polyolefin compositions and, in certain cases, improved color characteristics, as well. The present invention also includes the improved filler material containing an effective amount of the phosphonate for such improved thermal stability when placed in the polyolefin resin.

DETAILED DESCRIPTION OF THE PRESENT INVENTION

The polyolefin resin and filler which form major components of the claimed compositions are well-known to persons of ordinary skill in the art.

The polyolefin resins which are suitable for use in the present invention include such well-known polymers as polyethylene and polypropylene. The polyolefin resin will generally comprise about 30% to about 95%, by weight of the blend of the present invention.

The type of filler material which is used in the blend of the present invention is known to the person of ordinary skill in the art. It is a finely divided material having an average particle size of from about 0.01 micron to about 100 microns, preferably from about 0.03 micron to about 25 microns, so as to be suitable as a filler material for polyolefin substrates. The type of inorganic filler which may be used in the practice of the present invention includes such fillers as the metal silicates and carbonates. A representative example of a silicate material is talc which is a magnesium silicate. A representative preferred example of a metal carbonate is calcium carbonate. Other suitable fillers include magnesium carbonate, hydrated alumina, silica, aluminum silicate, magnesium oxide, iron oxide, diatomaceous earth, mica, kaolin, and bentonite. The filler material will generally be present in the blend of the present invention at from about 5% to about 70%, by weight of the blend.

The blends of the present invention involve the incorporation in the blend of polyolefin and filler of an effective amount for improved thermal stability for such blends of a neutral dipolyoxyalkylene hydroxyalkyl phosphonate. This phosphate ester composition can be added to the filler before it is admixed with the polyolefin, can be added to either the filler or polyolefin as they are mixed, or can be added to the blend after it is formed. The composition can be added neat or in the form of a low boiling organic solvent, such as methylene chloride. Effective amounts range from about 0.1% to about 3%, based on the weight of filler in the polyolefin. The invention also includes the filler material which has been treated with the above-described phosphonate.

In order to achieve the desired improvement in thermal stability, and in most cases, color improvement, for the filled polyolefin compositions of the present invention, the present invention contemplates the presence of an effective amount of a dipolyoxyalkylene hydroxyalkyl phosphonate. Such compounds are known and have been used as stabilizers, plasticizers, flame retardants and as a lubricant and hydraulic fluid as described in U.S. Pat. No. 3,970,729 to E. N. Walsh et al. which is incorporated herein by reference. The compounds have the following formula

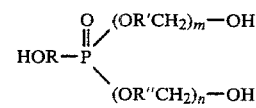

where R, R'and R"are independently $C_1$-$C_3$ alkyl groups, and the sum of m and n is an integer from 2 to 10. A particularly preferred compound is di(polyoxyethylene)hydroxymethyl phosphonate which is commercially available as VICTASTAB HMP from Stauffer Chemical Company.

In addition to the foregoing described polyolefin resin, filler, and phosphonate additive, the blends of the present invention can also contain any compatible conventional additives normally used in filled polyolefin resin compositions which do not frustrate the purpose of the phosphate compositions. Representative additives of this type include: flame retardants, colorants, lubricants, processing aids, other antioxidants and stabilizers, and the like.

The following Examples are presented to illustrate certain embodiments of the present invention.

EXAMPLES 1-3

These Examples illustrate the effect noted when a di(polyoxyalkylene)hydroxyalkyl phosphonate is used to treat calcium carbonate filler in a 60% polypropylene/40% calcium carbonate system (Example 3) as compared to a control formulation not containing the phosphonate (Examples 1 and 2).

Example 1 is a control blend of 60% polypropylene (HERCULES 6523) and 40% calcium carbonate (ATOMITE from Thompson, Weinman Co.). Example 2 is similar with the exception that the calcium carbonate had been mixed with dichloromethane and dried prior to combination with the polypropylene. Both mixtures were extruded at 232° C. and injection molded at 190°–204° C. to form the test plaques.

Example 3 was similarly formed with the exception that the calcium carbonate was mixed with 1%, by weight of filler, of di(polyoxyethylene)hydroxymethyl phosphonate (VICTASTAB HMP from Stauffer Chemical Company) via dichloromethane solution followed by drying before combination with the polypropylene.

Test plaques having a thickness of 0.32 cm. were formed and were: (1) tested in a Hunter color meter to determine the degree of color improvement and (2) left in a circulating air oven at 150° C. until a powdery residue appeared on the specimen surface to measure oven stability.

The following values were noted with $\Delta E$ indicating the color difference from a magnesium oxide standard and encompassing changes along the light-dark, red-green and yellow-blue color coordinates. Lower numbers indicate a less colored specimen. These values were calculated using the Hunter L, $a_L$, $b_L$ color difference formula which is described in Wyszecki et al., Color Science: Concepts and Methods, Quantitative Data and Formulas, Table 6.3, Formula No. 6, p. 460 John Wiley and Sons, Inc., New York, 1970) using a Hunter Associates Laboratory tristimulus Colorimeter (Model D25-D2). The time for the powdery residue to appear on the samples inserted in the oven is a measure of the oven stability of the specimen. Longer periods of time indicate a more heat resistant specimen.

The following results were obtained:

| Example | Hunter Color ($\Delta E$) | Oven Stability (days) |
|---|---|---|
| 1 (Control) | 16 | 4 |
| 2 (Control) | 13 | 2 |
| 3 | 10 | 33 |

EXAMPLES 4-5

These Examples show the improvement in both oven stability and color when the present invention is used in a propylene/Montana talc composition. The composition comprised 50%, by weight, Montana talc in polypropylene and was compounded on a Brabender apparatus at 180° C. at 60 rpm. The polypropylene had been fluxed for 5 minutes at that temperature prior to addition of the filler. Example 4 is a control run wherein the filler was untreated. The filler used in Example 5 was treated with 2%, by weight of the filler, with the phosphonate composition described herein (VICTASTAB HMP). The respective compositions were then pressed into 0.081 cm. thick plaques for testing.

The following results were obtained:

| Example | Hunter Color ($\Delta E$) | Oven Stability (days) |
|---|---|---|
| 4 (Control) | 52 | <3 |
| 5 | 27 | 12 |

The foregoing Examples are intended to be merely illustrative of the present invention and should not therefore be construed in a limiting manner. The scope of protection that is desired is set forth in the claims which follow.

What is claimed:

1. A filler material which improves the thermal stability of polyolefin compositions containing it which comprises an inorganic filler and an effective amount for such improved thermal stability of a dipolyoxyalkylene hydroxyalkyl phosphonate having the formula

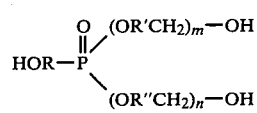

where R, R' and R'' are independently $C_1$–$C_4$ alkyl and the sum of m and n is an integer from 2 to 10.

2. A filler material as claimed in claim 1 wherein the filler is selected from the group consisting of the metal silicates and the metal carbonates.

3. A filler material as claimed in claim 1 wherein the filler material is selected from the group consisting of talc and calcium carbonate.

4. A filler material as claimed in either claim 1, 2 or 3 wherein the phosphonate is di(polyoxyethylene)hydroxymethyl phosphonate.

* * * * *